United States Patent [19]

Qui et al.

[11] Patent Number: 5,058,118
[45] Date of Patent: Oct. 15, 1991

[54] SELF-FREQUENCY-DOUBLING MINILASER DEVICE WITH NYAB CRYSTAL AS LASER MATERIALS

[75] Inventors: Minwang Qui; Yichuan Huang; Aidong Jiang; Zundu Luo, all of Fujian, China

[73] Assignee: Fujian Institute of Research on the Structure of Matter, Chinese Academy of Science, Fujian, China

[21] Appl. No.: 505,022

[22] Filed: Apr. 5, 1990

[30] Foreign Application Priority Data

Apr. 15, 1989 [CN] China .............................. 89 1 02343.7
Jun. 1, 1989 [CN] China .............................. 89 1 03818.3

[51] Int. Cl.$^5$ .............................................. H01S 3/10
[52] U.S. Cl. .......................................... 372/21; 372/41; 372/22; 372/69
[58] Field of Search ....................... 372/394, 22, 21, 69

[56] References Cited

U.S. PATENT DOCUMENTS 4,942,582 7/1990 Kintz ...................... 372/22

OTHER PUBLICATIONS

En Quan et al; "Study of Self-Frequency-Doubling from 1.06 to 0.53 μm with a Multi-Functional Crystal N7AB"; Acta Optica Sinica, vol. 7, No. 2, Feb. 1987.
En Quan et al; "Excited Emission & Self Frequency Doubling Effect of $Nd_xY_{1-x}Al_3(BO_3)_4$ Crystal", Chinese Phys. Lett., vol. 3, No. 9, Mar. '86.
Publication: Sov. J. Quantum Electronics 13(7), Jul. 1983 by L. M. Dorozhkin et al.
"(Laser Self-Doubling in Neodymium Yttrium Aluminum Borate)", J. Applied Physics, 66(12), Dec. 15, 1989.

*Primary Examiner*—Leon Scott, Jr.

[57] ABSTRACT

A minilaser device exhibiting both laser and non-linear optical effects. The device includes a single laser crystal bar of NYAB which inhibits non-linear characteristics, and serves as a self-frequency-doubling crystal having the laser and non-linear optical effects, and a pumping source for the device to generate laser light.

13 Claims, 1 Drawing Sheet

SELF-FREQUENCY-DOUBLING MINILASER DEVICE WITH NYAB CRYSTAL AS LASER MATERIALS

BACKGROUND OF THE INVENTION

1. Field of the Invention

This invention relates to a laser device, and particularly to a minilaser device with both laser and frequency-doubling effects using NYAB [$Nd_xY_{1-x}Al_3(BO_3)_4$ (x=0.03-0.08)] single crystal as laser crystal.

2. Description of Related Art

With the development of laser technology and applications thereof, there is increasing demand for multifunction materials with both laser and non-linear optical effects so that the great interest has been aroused in investigation on the crystal materials and their laser devices which are capable of emitting visible laser light directly.

Prior to the 1970's, there were reports on scientific research work in obtaining multifunction crystals by means with doping $LiNbO_3$ crystal with $Tm^{3+}$ and $Nd^{3+}$ ions. Experiments of self-frequency doubling lasers have been carried out with the crystal of $Nd^{3+}$:$LiNbO_3$. It is found that owing to the doping of the unmatched valence and ionic radius of $Nd^{3+}$ ions, the optical homegeneity of the crystal deteriorates such that it has not yet come into practical use. In 1983, Soviet scientists successfully developed the multifunction crystal of $Nd_{0.2}Y_{0.8}Al_3(BO_3)_4$ to realize the self-frequency-doubling laser effect from 1.32 $\mu$m to 0.66 $\mu$m. Since 1986, The crystal of $Nd_xY_{1-x}Al_3(BO_3)_4$(x=0.05-0.15) has been grown by flux method in the Institute of Crystal Material in Shandong University, with which the operation of self-frequency-doubling laser emissions from 1.06 $\mu$m into 0.53 $\mu$m has been realized at the pumping of a 587.8 nm laser beam of a pulsed dye laser. However, it is valueless to use a laser as a pumping source, which is itself capable of tuning to a wavelength of 0.53 $\mu$m with higher energy output, to generate the 0.53 $\mu$m laser beam with lower energy output by the self-frequency-doubling effect. The inventors have found, by an investigation of the relationship between the structure and the properties of the material, the crystal of $Nd_xY_{1-x}Al_3(BO_3)_4$ is an ideal self-frequency-doubling laser material because of its large binding energy, high hardness and high thermal conductivity, and of good physico-chemical stability. The optical homogeneity of the crystal has not been deteriorated by the doping of $Nd^{3+}$ ions. On the other hand, it has lower concentration quenching effect when doping the crystal with a high $Nd^{3+}$ level which is necessary for a minilaser device with high gain coefficient.

Due to the special conditions required in the experiment of self-frequency-doubling laser, in order to study the relationship between the frequency-doubling effect and length of the crystal bars as well as the $Nd^{3+}$ doping level, the inventors have modified the non-linear optical couple equation to determine the range of numerical value of X, to be X=0.03-0.08.

In a general sense the object of the invention is to provide a practical minilaser device with both laser and frequency-doubling effects utilizing the single crystal of $Nd_xY_{1-x}Al_3(BO_3)_4$(x=0.03-0.08), with the output laser wavelength at 0.532 $\mu$m.

BRIEF DESCRIPTION OF THE DRAWINGS

The above and other and further objects, features and advantages of the invention will be apparent from the following description taken in connection with the illustrative embodiments and the accompanying drawings, wherein.

DETAILED DESCRIPTION OF PREFERRED EMBODIMENTS

Figure 1:
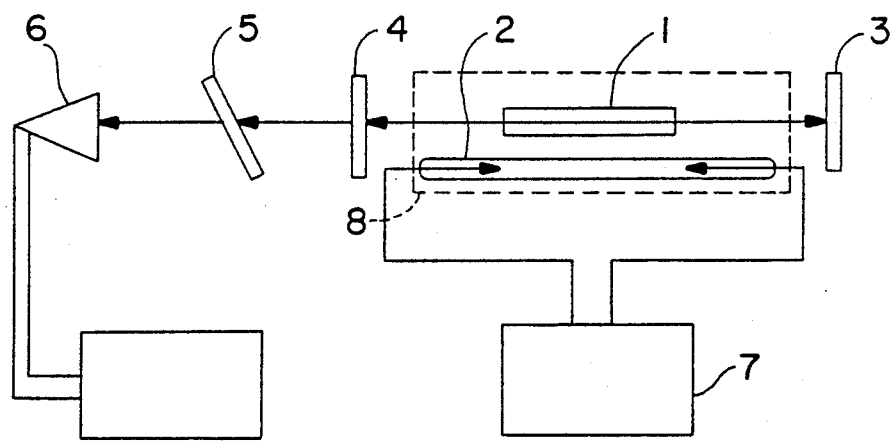
FIG. 1 diagrammatically illustrates a first embodiment of the present invention.

The present invention is directed to a minilaser device comprising single crystal of $Nd_xY_{1-x}Al_3(BO_3)_4$(x=0.03-0.08) as a self-frequency-doubling laser material to generate 0.532 $\mu$m and 0.660 $\mu$m laser beam upon the optical pumping of a selected one of a coherent or incoherent light pumping source. The incoherent pumping source may be xenon or krypton lamps in the shape of a straight-line or spiral or annular, or LED diodes, which can be of pulsed or continued wave output. The coherent pumping source may be laser light source, such as a single laser diode or a matrix laser diode series, which can also be of pulsed or continued wave output. The crystal may be cut into bar stock of different sizes in accordance with the phase matching direction of type I or type II. The incoherent or coherent light source as the pumping source may be installed side by side with the bar stock, or placed at one end of the stock of the crystal.

After repeated experimentation, the inventors have discovered that $Nd^{3+}$ doped YAB crystals ($Nd_xY_{1-x}Al_3(BO_3)_4$), where the numerical value of X ranges from 0.03-0.08, can be grown in large size with good optical homogeneity. The crystal can be cut into different sizes of bar stock in accordance with the phase matching angle of type I or type II in order to generate a laser beam output in the wavelength of 0.532 $\mu$m and 0.660 $\mu$m.

The intensity of the frequency-doubling laser beam output by the crystal bar cut in the phase matching direction of type I is about four times greater than that of output by the crystal bar cut in the phase matching direction of type II.

The structure of the crystal $Nd_xY_{1-x}Al_3(BO_3)_4$(x=0.03-0.08) belongs to trigonal system with the space group $R_{32}$ and lattice parameters of a=b=9.293Å, c=7.245Å, Z=4. There exist two kinds of phase-matching: type I and type II, which means that the laser beam both in basic frequency and doubling frequency are satisfied with a coherence-strengthening condition in certain directions in the crystal, namely $$\Delta \overline{k} = o\left(k = \frac{n\omega}{c}\right)$$

wherein k is a wave vector, n being the index of refraction to the corresponding wavelength, c being the velocity of light, and $\omega$ being circular frequency. Under the coaxial phase-matching condition, the direction of propagation is co-linear to both basic and doubling frequency lights so that $\Delta k=0$, and (1) in phase-matching of type I (o+o→e)

$$No^\omega = Ne^{2\omega}(\theta_m^I)$$

(2) in phase-matching of type II (o+e→e)

$$No^\omega + Ne^\omega(\theta_m^{II}) = 2Ne^{2\omega}(\theta_m^{II})$$

Details were reported in <<Acta Optica sinica>> (vol. 7, No. 2, pp. 139–142) by Liu En-Quan.

The effective non-linear optical coefficiency are:

$$X_{eff}^I = F_2(\theta_m^I, \phi, d_{11}) = d_{11} \cos\theta_m^I \cos 3\phi$$

$$X_{eff}^{II} = F_1(\theta_m^{II}, \phi, d_{11}) = d_{11} \cos\theta_m^{II} \sin 3\phi$$

wherein $d_{11}$ is the non-linear optical coefficiency of the crystal, $\phi$ being the azimuth of the crystal to the axis a, $\theta_m$ being the angle to the axis c, i.e. phase-matching angle in type I or type II. Results are obtained as follows:

| | |
|---|---|
| $N_o^\omega = 1.7553$; | $N_e^\omega = 1.6869$; |
| $N_o^{2\omega} = 1.7808$; | $N_e^{2\omega} = 1.7050$ |
| $\theta_m^I = 32° 54'$ | $\theta_m^{II} = 51° 2'$ | and when $$\phi = n\frac{\pi}{3}, \quad X_{eff}^I \text{ has the maximum,}$$

$$X_{eff}^I = 0.8235\, d_{11} \quad X_{eff}^{II} = 0.4032\, d_{11}$$

$$X_{eff}^I = 2.04\, X_{eff}^{II}$$

The intensity of the frequency-doubling light is directly proportional to the squared effective non-linear optical coefficiency. Therefore, the intensity of the frequency-doubling light in phase-matching of type I is four times that of the phase-matching of type II.

The inventors of present invention have also discovered that the crystal of $Nd_xY_{1-x}Al_3(BO_3)_4$ (x=0.03–0.08) is of excellent physical and chemical properties, such as high hardness, anti-deliquescence, anti-cleavage, high acid and alkali-resistance, good optical homogeneity and relatively high thermal conductivity. This is the advantages of the NYAB crystal compared with the $LiNbO_3$ crystal. Obviously, the NYAB crystal should be the laser material which can be used over a long period of time without damage or deterioration. Due to its room temperature phase matching, the NYAB crystal is found to have a lower laser threshold and better laser performances than those of the $Nd^{3+}:LiNbO_3$ crystal, which has a phase matching temperature of 152° C., so that NYAB can be applied either to a lamp pumped laser system or to pulsed and cw laser pumped laser systems. In particular, NYAB has advantages in getting the green output pumped by a semiconductor diode laser.

The pumping source can be incoherent, which has at least one peak at about 588 nm and /or 807 nm. The stronger the peak emission at the above three wavelengths is, the higher the working efficiency of the crystal will be. Commercial available krypton lamp, xenon lamp and optical spectrum matched laser diodes are suitable pumping source. Where the pumping sources works by way of a pulsed wave, the generated laser beam will be pulsed. Where the pumping source works by way of a continued wave, the generated laser beam will be continuous. The laser energy output should be increasing rapidly with the enhancement of the pumping energy. It has been measured that the laser beam divergence is $\theta = 2.3$ m rad, the laser beam output is of linear polarized light with high collimation.

EMBODIMENT 1

Refering to the first embodiment of the invention illustrated in FIG. 1, element 1-represents the crystal bar of $Nd_xY_{1-x}Al_3(BO_3)_4$ (x=0.03–0.08), element 2 is a xenon lamp in straightline, annuloid or spiral shape, and element 3 mirror with total reflection of 1.06 μm and 0.53 μm wavelengths. There is also included a mirror 4 with total reflection at 1.06 μm and total transparency at 0.53 μm wavelength, an optical filter 5 filter with total reflection at 1.06 μm wavelength and total transparency at 0.53 μm wavelength, an LPE-1A meter 6 for measuring the laser energy output, a pulsed laser electricity source 7, and a —focus reflector 8, with a single ellipsoid reflector with the crystal bar and pumping source placed at each focus point respectively. The major axis of the ellipsoid 2a=10 mm, and the minor axis 2b=8.6 mm, e=0.51. The reflector is made of brass, and its inside surface is polished and silver plated.

Where the pulsed xenon lamp is replaced by a CW krypton lamp or high repetition rate pulsed xenon lamp, the laser device can be made into a high repetition rate pulsed or cw, one preferably being provided with cooling means, such as water cooling, air cooling or semiconductor refrigerating, etc.

EMBODIMENT 2

Figure 2:
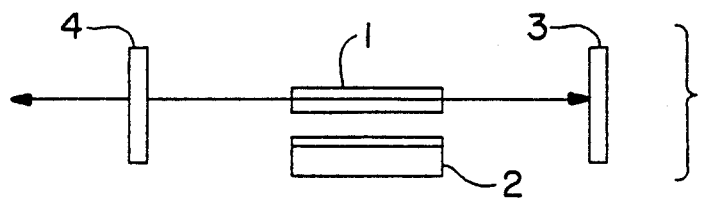
FIG. 2 diagrammatically illustrates a second embodiment of the present invention.

FIG. 2 shows an embodiment of the laser device of the present invention, pumped by LED or semiconductor diode laser, where the crystal bar 1 is of $Nd_xY_{1-x}Al_3(BO_3)_4$ (x=0.03–0.08) with reflection coating on one side-surface thereof to focus the pumping light instead of a focus reflector. Also included is an LED array 2 or laser diode array, a mirror 3 with total reflection at 1.06 μm and 0.53 μm, and a mirror 4 with total reflection at 1.06 μm and total transparency at 0.53 μm.

EMBODIMENT 3

Figure 3:
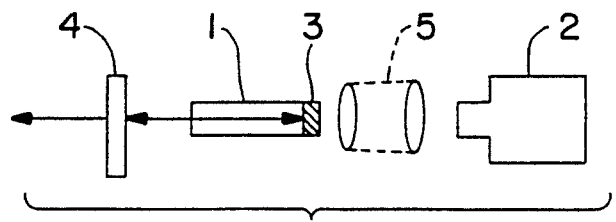
FIG. 3 diagrammatically illustrates a third embodiment of the present invention.

FIG. 3 shows another embodiment of the present invention pumped by a high intensity LED or laser diode or array of laser diodes, wherein a crystal bar 1 is of $Nd_xY_{1-x}Al_3(BO_3)_4$(x=0.03–0.08). There is also provided a high intensity LED 2 or laser diode or array of laser diodes, a membraneous medium 3 with total reflection at 1.06 μm and 0.53 μm and high transparency at the region of about 8000Å–8100Å, which may be directly coated on the end-surface of the crystal bar, an outputing mirror 4 with total reflection at 1.06 μm and total transparency at 0.53 μm, which can also be coated on the other end surface of the crystal bar, and a telescope system 5 to adjust the aperture and collimation of the pumping light beam.

It should further be described that the requirements for the crystal bar can be met in the ordinary process of precision-machined parts of optical properties such as flatness of less than $\frac{1}{8}\lambda$, fineness of V class, perpendicularly of less than 20", and parallelism of less than 10", etc.

EMBODIMENT 4

Using $\phi 3$ mm × 25 mm pulsed xenon lamp as a pumping source, the performance parameters of the laser device with $\phi 3.5$ mm × 12.16 mm NYAB crystal bar are measured by LPE-1A laser energy output meter and Tektronix 466 oscillograph:

| | |
|---|---|
| Laser threshold | ~57.3 mj |
| Laser energy output | ~3 mj (Q switch) |
| Pulse duration (free runing) | 100 ns (Q switch 5-8 ns) |
| beam polarization | >90% |
| beam divergence | 2 mrad. |

The wave form of the laser pulse is taken by the oscillograph.

The wavelength of the green laser beam generated by the NYAB laser device is measured to be 0.532 μm by means of a 44W grating monochromator.

As set forth hereinabove, the present invention provides a laser device with NYAB crystal, which can be pumped by commonly available mini-flash-lamps and can be made into a practical laser device with small size, light weight and low energy consumption so as to be easily carried along to the plateaux, mountains and villages which have minimal transportation facilities. One of the embodiments in the present invention possesses the volume of only 42 mm × 72 mm × 135 mm and the weight of 400 grams, and is power supplied by a dry pencil battery (5#).

The laser device provided by the present invention is of green laser beams generating, small-sized and incoherent or coherent light pumped so as to be capable of application to the fields of laser medical treatment, laser holography, high-speed laser photograph, laser measurement of the velocity field, laser communication in the sea, laser drill and air-photo, etc. While there has been described what is at present considered to be preferred embodiments of the invention, it will be understood that various modifications may be made therein, and it is intended to cover in the appended claims all such modifications as fall within the true spirit and scope of the invention.

What is claimed is:

1. A minilaser device with both laser and non-linear optical effects comprising:

a single crystal-bar of $Nd_xY_{1-x}Al_3(BO_3)_4$ where (x=0.03→0.08) and serves as a self-frequency-doubling crystal capable of performing a frequency conversion process within the crystal; and a pumping source for optically pumping said single crystal bar of said device to generate a laser light output from said single crystal bar of 0.532 μm and 0.660 μm, said pumping source being selected from one of a coherent pumping source and an incoherent pumping source.

2. The minilaser device as claimed in claim 1, wherein said single crystal-bar is cut in accordance with a phase-matching angle of a Type I or Type II crystal.

3. The minilaser device as claimed in claim 1 or 2, wherein said incoherent pumping source is selected from the group consistent of a straight-shaped lamp, a spiral-shaped lamp, or an annuloid lamp.

4. The minilaser device as claimed in claim 3, wherein said incoherent pumping source is either pulsed or continuous.

5. The minilaser device as claimed in claim 1, 2, or 4, wherein said incoherent pumping source is selected from the group consisting of a xenon lamp, a krypton lamp, or optical spectrum matched laser diodes.

6. The minilaser device as claimed in claim 5, wherein said incoherent pumping source is installed beside the side of said crystal bar or at one end of said crystal bar.

7. The minilaser device as claimed in claim 1 or 2, wherein said coherent pumping source is selected from the group consisting of a semi-conductor diode laser or array of diode laser.

8. The minilaser device as claimed in claim 7, wherein said coherent pumping source is pulsed or continuous.

9. The minilaser device as claimed in claim 8, wherein said coherent pumping source is installed beside the side of said crystal bar or at one end of said crystal bar.

10. The minilaser device as claimed in claim 7, wherein said laser diode or array of laser diodes generates waves in the range of 7000Å-8500Å.

11. The minilaser device as claimed in claim 4, wherein said incoherent pumping source is selected from the group consisting of xenon lamp, krypton lamp, or optical spectrum matched laser diodes.

12. The minilaser device as claimed in claim 10, wherein a peak output is in the range of 7400Å-7500Å.

13. The minilaser device as claimed in claim 10, wherein a peak output is in the range of 8000Å-8100Å.

* * * * *